May 12, 1970

P. M. LLEWELLYN 3,511,986

ION CYCLOTRON DOUBLE RESONANCE SPECTROMETER EMPLOYING
RESONANCE IN THE ION SOURCE AND ANALYZER

Filed May 15, 1967

INVENTOR.
PETER M. LLEWELLYN

BY
Wm J Nolan
ATTORNEY

INVENTOR.
PETER M. LLEWELLYN
BY
ATTORNEY

United States Patent Office 3,511,986
Patented May 12, 1970

3,511,986
ION CYCLOTRON DOUBLE RESONANCE SPEC-
TROMETER EMPLOYING RESONANCE IN THE
ION SOURCE AND ANALYZER
Peter M. Llewellyn, Menlo, Park, Calif., assignor to
Varian Associates, Palo Alto, Calif., a corporation of
California
Filed May 15, 1967, Ser. No. 638,247
Int. Cl. B01d 59/44; H01j 39/34
U.S. Cl. 250—41.9                                    7 Claims

ABSTRACT OF THE DISCLOSURE

An ion cyclotron resonance spectrometer is disclosed which employs cyclotron resonance of a first species of ions in the ion source region and which employs cyclotron resonance of a second species of ions in a successive analyzer region. The spectrometer includes an electrode structure enclosed in an evacuated chamber and immersed in a unidirectional magnetic field. The electrode structure includes an ion source region for forming and projecting a beam of ions over a linear beam path to an ion collector. An analyzer structure is disposed along the beam path between the ion source and the ion collector for exciting and detecting cyclotron resonance of ions passing from the source into the analyzer. The ion source also includes structure for exciting cyclotron resonance of a certain predetermined species of ions with a relatively strong radio frequency electric field such that some of these resonant ions are selectively driven out of the ion beam by the applied RF field. The applied RF field, used to selectively remove the predetermined ion species from the beam is modulated at a convenient audio frequency such that the selected ion removal effect is modulated. A detector is provided for detecting such modulation, if any, in the resonance of a second species of ions within the analyzer region. Such modulation of the resonance of the second species may be employed to identify unimolecular dissociation products of ion species selectively driven out of the beam in the source.

DESCRIPTION OF THE PRIOR ART

Heretofore, double resonance ion cyclotron spectrometers have been built. Such a spectrometer is described and claimed in copending U.S. patent application 566,973 filed July 21, 1966 and assigned to the same assignee as the present invention. In this prior spectrometer, ions are formed in a first region and projected into a separate analyzer region wherein simultaneous cyclotron resonance of two ion species is obtained at different cyclotron resonance frequencies. Such a spectrometer is especially useful for analyzing certain types of chemical and charge transfer reactions between ions and molecules. However, this prior spectrometer is not well suited for analyzing unimolecular dissociation wherein a molecule will disassociate into two or more fragments with a decay time on the order of 20 microseconds since the decay is completed by the time the fragments reach the analyzer and it is not possible to ascertain the source of the fragments.

SUMMARY OF THE PRESENT INVENTION

The principal object of the present invention is the provision of an improved ion cyclotron resonance mass spectrometer.

One feature of the present invention is the provision, in an ion cyclotron resonance spectrometer, of means for applying a cyclotron resonance radio frequency electric field in the ion source region to selectively resonate a preselected ion species to facilitate detection of certain molecular reactions in the successive analyzer region.

Another feature of the present invention is the same as the preceding feature wherein the resonance exciting radio frequency field applied in the ion source region is of sufficient intensity to drive some of the preselected resonant ion species out of the ion beam, whereby unimolecular dissociation reaction ion products of the preselected ion species may be identified in the successive analyzer region.

Another feature of the present invention is the same as any one or more of the preceding features wherein a modulator is provided for modulating the applied radio frequency electric field in the ion source region to produce a modulation of the number of the ion dissociation products, if any, passed through to and to be detected in the analyzer region.

Another feature of the present invention is the same as any one or more of the preceding features wherein the applied RF electric field in the source region is sufficiently strong to remove the selected resonant ions from the ion beam in less than $200\mu$ seconds and preferably less than $50\mu$ seconds.

Other features and advantages of the present invention will become apparent upon a perusal of the following specifications taken in connection with the accompanying drawings wherein:

DESCRIPTION OF THE PREFERRED EMBODIMENTS

Figure 1:
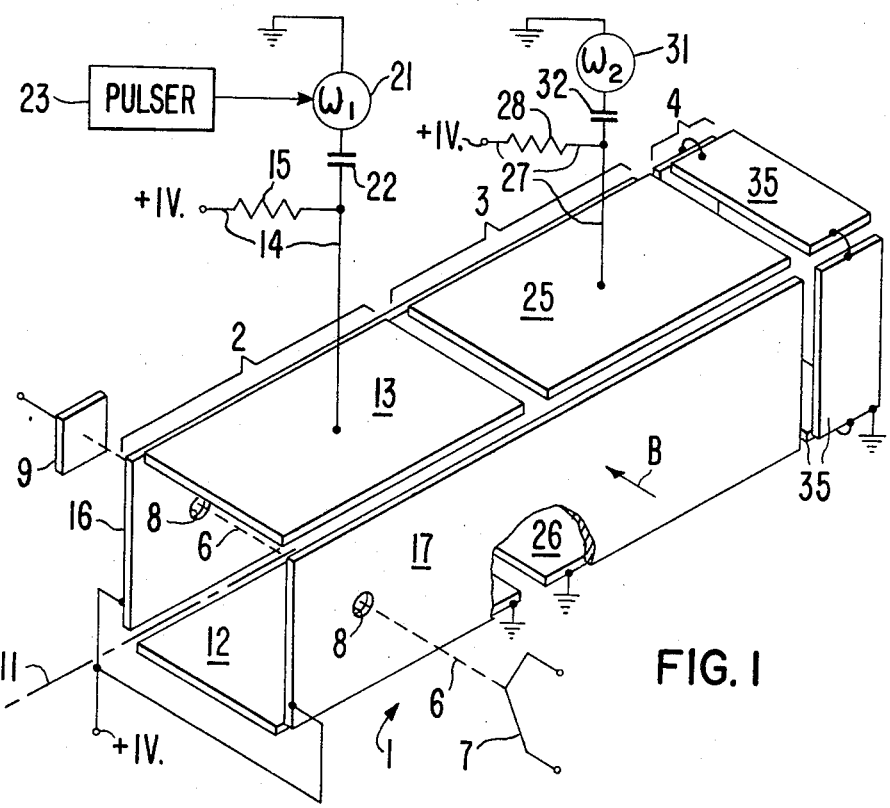
FIG. 1 is a schematic perspective view of the electrode structure of an ion cyclotron resonance spectrometer of the present invention.

Referring now to FIG. 1, there is shown the ion cyclotron resonance electrode structure for exciting and detecting cyclotron resonance. More specifically, the electrode structure comprises a generally rectangular hollow elongated structure 1 separated into three functional regions, an ion source region 2, an analyzer region 3, and an ion collector region 4. The structure 1 is immersed in a uniform unidirectional magnetic field B, as of 3000 gauss, and the structure is enclosed in an evacuated envelope, not shown in FIG. 1.

In the ion source region 2, a beam of electrons 6 is fed from a filamentary emitter 7 through a pair of aligned apertures 8 in the electrode structure to an electron collector electrode 9. The electron beam 6 serves to ionize gas by collision inside the source region 2 of the electrode structure 1. The ions which are produced are caused to be projected toward the other end of the structure 1 along a beam path 11 which is axially directed of the structure 1. The individual ions in the beam have cyclocidal trajectories along the beam path 11. The ions move in the beam path due to the provision of a static electric field produced at right angles to the unidirectional magnetic field by an electrical potential, as of 1 volt, applied between a grounded bottom electrode plate 12 and an upper electrode plate 13. The static potential is applied to plate 13 via lead 14 and RF isolating resistor 15. A similar static potential relative to the grounded bottom plate, is applied to a pair of side plates 16 and 17 in order to trap the ions within a beam path equidistant between the side plates 16 and 17.

A radio frequency transmitter 21 is connected to apply an RF electrical potential between the top and bottom plates 13 and 12 respectively, in the ion source region 2. A DC blocking capacitor 22 is connected between the transmitter and lead 14 to prevent the DC voltage from being carried into the transmitter 21. The RF potential supplied from transmitter 21 is relatively high, as of 10 volts, and is selected to be at a frequency $\omega_1$, to produce cyclotron resonance of a certain predetermined ion species in the magnetic field B within the ion source 2. The strength of the RF field is selected to be sufficiently great such that an appreciable number of the cyclotron resonant ions will have their cycloidal orbits sufficiently expanded due to their absorption of the RF energy to be collected on the surrounding electrode structure, such as plates 12, 13, 16, and 17, and, thus, are driven out of and selectively removed from the beam 11. A pulser 23 modulates the intensity of the applied radio frequency potential obtained from the transmitter 21 by preferably 100% and at some convenient audio frequency such as 40 Hz. Alternatively, the frequency of the transmitter 21 may be modulated at the audio frequency.

In the analyzer region 3, separate top and bottom plate electrodes 25 and 26, respectively, have the static $+1$ v. electrical potential applied thereacross, as with electrodes 12 and 13, to cause the ions to follow the beam path 11. The static electrical potential is applied via lead 27 and RF isolating resistor 28. A radio frequency potential is applied between top and bottom plates 25 and 26 from an oscillating detector 31 via DC blocking capacitor 32 and lead 27. The frequency $\omega_2$ of the oscillating detector 31 is selected to excite and detect cyclotron resonance of sequentially selected ion species within the analyzer region 3.

In the ion collector region 4, a four sided grounded electrode structure 35 provides an electric field free region in which the ions will drift parallel to the magnetic field B to the side plates 35 and be collected.

Figure 2:
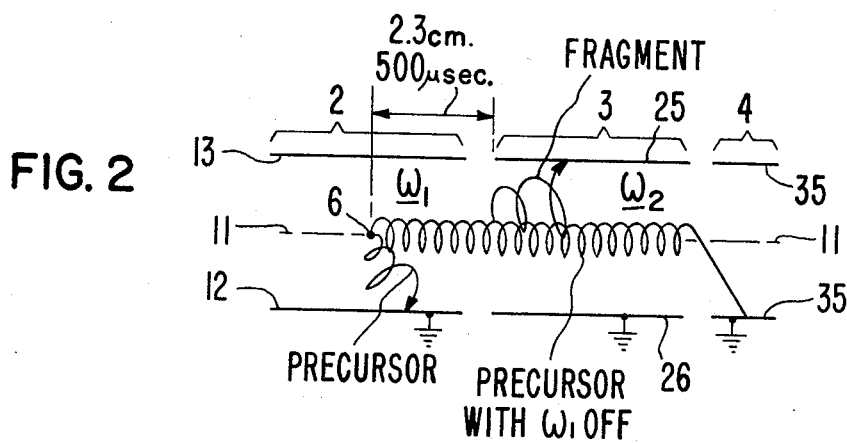
FIG. 2 is a schematic line diagram of the electrode structure of FIG. 1 depicting its mode of operation.
Figure 3:
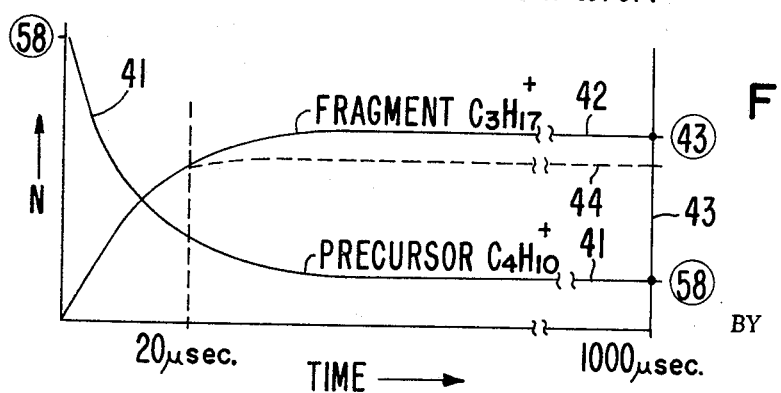
FIG. 3 is a plot of the number of precursor and fragment ions as a function of drift time taken in the direction of the ion beam.

Referring now to FIGS. 2 and 3, it will be described how the apparatus of FIG. 1 may be employed to identify ion fragments of unimolecular dissociation. Assume, that in the ion source region 2, that a precursor $C_4H_{10}^+$ species of ions having mass 58 is produced and that such ions experience a unimolecular dissociation to $C_3H_7^+$, having a mass 43, and $CH_3$ fragment products with time which follows curve 41 of FIG. 3. Under typical operating conditions of static magnetic and electric field intensities, the ions produced in the source 2 move the approximate 1 inch into the analyzer region 3 in about $500\mu$ seconds. Thus, in the absence of any disturbing influence in the ion source 2, there will be a certain average number of precursor and fragment ions in the analyzer region, as indicated by the intersection of lines 41 and 42 with the vertical line 43 at $1000\mu$ seconds.

Now, assume that a certain fraction of the precursor ions are selectively driven out of the beam in the ion source region 2 within about $20\mu$ seconds of their being generated. These ions are driven out, as previously described above, by selectively exciting cyclotron resonance of the precursor ions with a sufficiently strong radio frequency electric field. Those precursor ions which are selectivley removed from the ion beam do not produce their share of the $C_3H_7^+$ ion fragments with mass 43. Therefore, the number of fragment ions will be reduced to, for example, the level indicated by the intersection of dotted line 44 with line 43.

The selective removal effect is modulated by pulser 23 at the audio frequency to produce a corresponding audio frequency modulation in the number of fragment ions. This audio modulation component is detected in the resonance of the fragment ions in the analyzer region 3 to yield an output signal which identifies the mass 43 ions as a fragment product of the precursor ion of mass 58. The cyclotron resonance conditions may then be scanned through various possible mass numbers in the analyzer region to detect all the various ion fragment products. In a preferred embodiment, the frequency of the oscillating detector is scanned. Alternatively, the frequency of $\omega_1$ of the transmitter 21 may be scanned.

Figure 4:
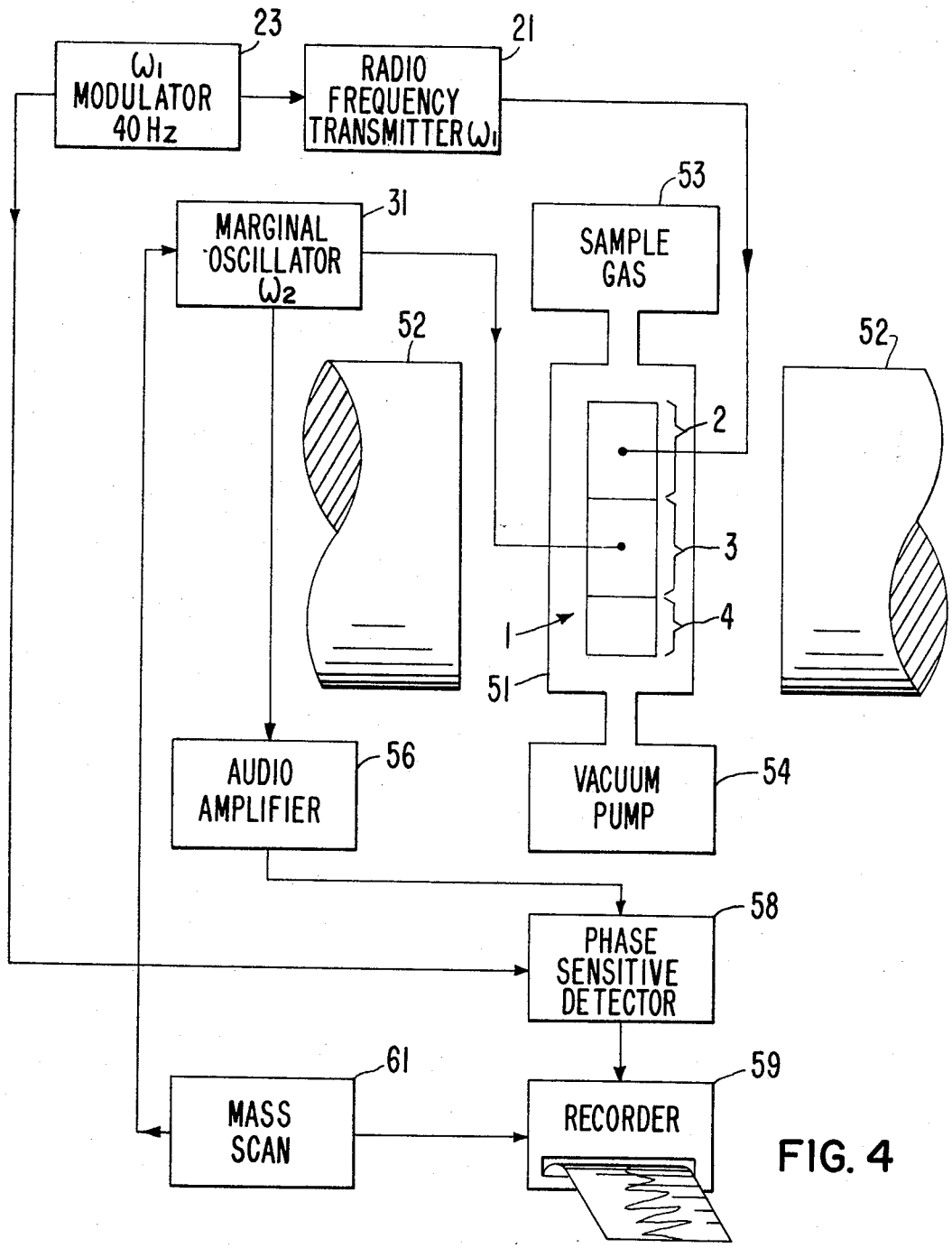
FIG. 4 is a schematic block diagram of the ion cyclotron resonance spectrometer of the present invention.

Referring now to FIG. 4, there is shown an ion cyclotron resonance spectrometer of the present invention. The electrode structure 1, as contained within its vacuum envelope 51, is immersed in the magnetic field B produced by an electromagnet 52. A sample gas supply 53 is connected to leak gas to be analyzed into the mass spectrometer. A vacuum pump 54 is connected to the envelope 51 for evacuating same to between $10^{-4}$ and $10^{-8}$ torr, as desired.

The radio frequency transmitter 21 supplies, a predetermined radio frequency potential, as of 170 to 300 kHz., to the ion source region 2 to excite cyclotron resonance of a certain precursor ion and to drive some of those ions out of the ion beam 11 in a time shorter than $200\mu$ seconds and preferably $20\mu$ seconds or less. A modulator 23 modulates either the intensity or frequency of the radio frequency transmitter 21 to modulate the precursor ion removal effect.

The marginal oscillator 31 feeds its radio frequency electric potential to the analyzer region 3 to excite and detect ion cyclotron resonance of ions within the analyzer region 3. The output of the marginal oscillator 31 is fed to an audio amplifier 56 wherein it is amplified and fed to one input of a phase sensitive detector 58 compared with a sample of the modulation signal applied to the precursor ion removal transmitter 21.

The output of the phase sensitive detector 58 is a DC signal which identifies the particular ion cyclotron resonance, if any, as a fragment of the precursor ion.

Figure 5:
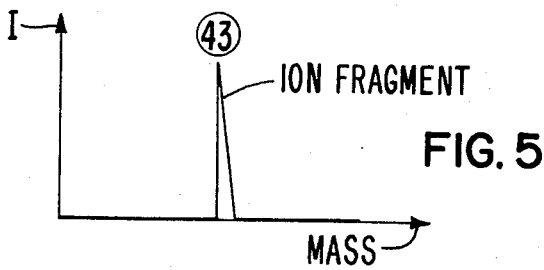
FIG. 5 is a spectrogram as obtained from the recorder output of the spectrometer of FIG. 4.

The output of the phase sensitive detector 58 is fed to a recorder 59 and recorded as a function of a mass scan produced by a mass scan generator 61. The mass scan scans the frequency of the marginal oscillator 31 at a very slow rate across the range of cyclotron resonance of interest. The output of the recorder 59 is a spectrogram, as shown in FIG. 5, wherein ion fragment peaks are displayed in accordance with mass number.

Although the electrode structure of the present invention has been described for detecting positive ions, it may be used to detect negative ions by reversing the sign of the voltage applied to the side plates 16, 17 and 25 and also the sign of B.

Although the apparatus of the present invention has been described as used for observing unimolecular dissociation, it is also useful for observing ion-molecule reactions. In ion-molecule analysis, the radio frequency electric field applied in the ion source region 2 need be only of an intensity to excite resonance of the ions. It is not necessary that resonant ions be driven out of the beam, although, if desired, some may be driven out of the beam. Information concerning the molecular reaction is obtained by observing resonance of a second specie of ion in the analyzer region, in the manner as taught in the aforecited application U.S. 566,973.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an ion cyclotron radio frequency spectrometer, means forming an ion source, means for ionizing gaseous substances within said ion source to be analyzed, means for projecting the ions along a predetermined beam path, means for applying a unidirectional magnetic field in said ion source, means forming an analyzer disposed along the beam path downstream of said ion source for applying a radio frequency electric field with a component at right angles to an applied unidirectional magnetic field to excite and detect cyclotron resonance of certain ion species in said analyzer means, the improvement comprising, means for applying a radio frequency electric field in said ion source with a component at right angles to said applied unidirectional magnetic field in said ion source for exciting ion cyclotron resonance of an ion species in said ion source, means for modulating the ion cyclotron resonance of the ion species in said ion source, and means for detecting the modulation, if any, of the cyclotron resonance in said analyzer means occasioned by the modulation of the resonance of the resonant ion species in said ion source.

2. The apparatus of claim 1 wherein said means for applying the radio frequency electric field in said ion source applies an electric field of sufficient amplitude to drive a substantial number of the resonant ions out of the beam, whereby unimolecular dissociation reaction products of the resonant ion species are identifiable in the said successive analyzer means.

3. The apparatus of claim 1 wherein said modulating means modulates the intensity of the applied radio frequency electric field in said ion source.

4. The apparatus of claim 1 wherein said modulating means modulates the frequency of the applied radio frequency electric field in said ion source.

5. The apparatus of claim 1 wherein said modulating means modulates the ion cyclotron resonance of the resonant ion species in said ion source at an audio frequency.

6. The apparatus of claim 1 wherein said analyzer means includes means for exciting and detecting cyclotron resonance of a second ion species different than said first resonant ion species.

7. The apparatus of claim 6 wherein said means for exciting and detecting cyclotron resonance of the second ion species in said analyzer includes means for producing the applied radio frequency electric field in said analyzer means at a different frequency than the radio frequency applied to excite resonance of the first ion species in said ion source.

References Cited

UNITED STATES PATENTS

| | | | |
|---|---|---|---|
| 2,829,260 | 4/1958 | Donner et al. | 250—41.9 |
| 3,254,209 | 5/1966 | Fite et al. | 250—41.9 |

WILLIAM F. LINDQUIST, Primary Examiner